(12) United States Patent
Engel et al.

(10) Patent No.: US 11,527,011 B2
(45) Date of Patent: Dec. 13, 2022

(54) LOCALIZATION AND MAPPING UTILIZING VISUAL ODOMETRY

(71) Applicant: META PLATFORMS TECHNOLOGIES, LLC, Menlo Park, CA (US)

(72) Inventors: Jakob Julian Engel, Seattle, WA (US); Anastasios Mourikis, Seattle, WA (US); Raul Mur Artal, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/486,664

(22) Filed: Sep. 27, 2021

(65) Prior Publication Data

US 2022/0122291 A1     Apr. 21, 2022

Related U.S. Application Data

(63) Continuation of application No. 17/469,664, filed on Sep. 8, 2021, now abandoned, which is a continuation of application No. 16/537,111, filed on Aug. 9, 2019, now abandoned.

(51) Int. Cl.
*G06T 7/73*     (2017.01)
*G01P 13/00*     (2006.01)

(52) U.S. Cl.
CPC ............... *G06T 7/74* (2017.01); *G01P 13/00* (2013.01); *G06T 2207/10016* (2013.01)

(58) Field of Classification Search
None
See application file for complete search history.

(56) References Cited

U.S. PATENT DOCUMENTS

2018/0045519 A1*     2/2018     Ghadiok ............. G06F 16/2379

FOREIGN PATENT DOCUMENTS

WO     WO-2019221800 A1 *     11/2019     ............. G06T 15/20

* cited by examiner

*Primary Examiner* — Andrew G Yang
(74) *Attorney, Agent, or Firm* — Baker Botts L.L.P.

(57) ABSTRACT

In one embodiment, a method includes determining correspondence data between a sequence of images based on identified features in the sequence of images and predicted pose based on motion data, and determining current state information based on the correspondence data and the motion data. The current state information comprises at least a current pose of the wearable device relative to the environment capture by the one or more cameras. Furthermore, the method comprises receiving map points in a three-dimensional map and their associated descriptors based on the identified features in the sequence of images and identifying one or more of the map points in the sequence of images based on the associated descriptors associated with the map points. The current state information is further determined based on the identified one or more of the map points.

20 Claims, 18 Drawing Sheets

LOCALIZATION AND MAPPING UTILIZING VISUAL ODOMETRY

PRIORITY

This application is a continuation under 35 U.S.C. § 120 of U.S. patent application Ser. No. 17/469,664, filed 8 Sep. 2021, which is a continuation of U.S. patent application Ser. No. 16/537,111, filed 9 Aug. 2019, both of which are incorporated herein by reference.

TECHNICAL FIELD

This disclosure generally relates to simultaneous localization and mapping (SLAM), and more specifically methods, apparatus, and system for SLAM using visual inertial odometry.

BACKGROUND

Mobile devices like AR/VR headsets face several practical design constraints, such as the need to minimize power consumption, in-device memory requirements, and weight. An important feature of AR/VR devices is to be able to solve the simultaneous localization and mapping problem, which is needed to enable, for example, world-locked rendering. For example, displaying a virtual pet at the same spot on a real-world table regardless of where viewer moves. However, to achieve the above feature, simultaneous localization and mapping requires either a large memory to store a map or continuously retrieving a live map online. Since accessing and storing map data is expensive, bulky, and power-consuming, it is desirable for the AR/VR devices to be able to solve for its own localization locally and globally with an optimized power performance and mobility.

SUMMARY OF PARTICULAR EMBODIMENTS

To address the foregoing problems, disclosed are methods, apparatuses, and a system, to perform simultaneous localization and mapping (SLAM) using visual inertial odometry (VIO). The present disclosure provides a self-sufficient VIO-based SLAM tracking system which comprises a tracking engine and a mapping engine to resolve the above issues. The tracking engine comprises a tracking unit, a filter unit, and an inertial measurement unit (IMU) integration unit to determine a location and a state of a user. The tracking unit is configured to find correspondences between observed objects in sequential frames (e.g., by matching the descriptors of each patch). To help with the search for correspondences, the tracking unit may leverage predicted poses generated from the IMU integration unit, so that the tracking process may also be used as a guided search. The filter unit receives the correspondences processed by the tracking unit, along with relevant IMU data, and generates a state information for a wearable device. Furthermore, the mapping engine may perform global mapping operations with the tracking engine at a much lower frequency than the tracking engine itself to be cost-efficient and power saving.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system, receiving, at an IMU integration unit, motion data captured by one or more motion sensors of a wearable device. The method further comprises generating, at the IMU integration unit, a predicted pose of the wearable device based on the motion data of the wearable device. The method yet further comprises receiving, at a tracking unit, a sequence of images of an environment captured by one or more cameras. The method additionally comprises identifying, at the tracking unit, features in the sequence of images. The method additionally comprises determining, at the tracking unit, correspondence data between the sequence of images based on the identified features in the sequence of images and the predicted pose received from the IMU integration unit. The method additionally comprises determining, at a filter unit, current state information of the wearable device based on the correspondence data received from the tracking unit and the motion data received from the IMU integration unit. The current state information comprises at least a current pose of the wearable device relative to the environment capture by the one or more cameras. Furthermore, the method comprises receiving, at the tracking unit, map points in a three-dimensional map and associated descriptors for the map points based on the features in the sequence of images. The method additionally comprises identifying, at the tracking unit, one or more of the map points in the sequence of images based on one or more of the associated descriptors associated with the one or more of the map points. The current state information is further determined based on the identified one or more of the map points.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a self-efficient, VIO-based tracking engine to localize the device in an environment and provide current state information of the user, in order to realize simultaneous localization and mapping locally. Furthermore, the methods disclosed in the present disclosure also provide a mapping engine to assist the tracking engine with global mapping, so that the methods disclosed in the present disclosure may generate permanent virtual tags in the global map by integrating the built state information for other users. In addition, the mapping engine performs the retrieval of map at a much lower frequency than the tracking engine to save power and cost.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains drawings executed in color. Copies of this patent or patent application publication with color drawing(s) will be provided by the Office upon request and payment of the necessary fee.

The accompanying drawing figures incorporated in and forming a part of this specification illustrate several aspects of the disclosure, and together with the description serve to explain the principles of the disclosure.

DESCRIPTION OF EXAMPLE EMBODIMENTS

Currently, AR/VR devices face multiple challenges, such as rendering a permanent virtual tag or object in a real-world map in a precise and cost-efficient way and manufacturing a light-weighted wearable device. Retrieving an online map continuously to perform simultaneous localization and mapping is expensive and power-consuming. An existing solution to avoid retrieving the online map constantly is equipped a memory for storing maps in the AR/VR devices, however, the trade-off of the solution is the mobility of the AR/VR device because of the increased weight and volume. Particular embodiments disclosed in the present disclosure provide a self-efficient VIO-based SLAM tracking system, which comprises a tracking engine and a mapping engine performed at different frequencies to provide a continuous tracking a pose of the user in an environment and a localization of the user in a live map.

Particular embodiments disclosed in the present disclosure provide a tracking engine in the tracking system comprising a tracking unit, an IMU integration unit, and a filter unit to generate a state of the user in an environment at high frequency. The filter unit in the present disclosure estimates the state of the user in the environment based on the correspondence data identified in a series of images sent from the tracking unit and aggregated IMU measurements sent from the IMU unit. Furthermore, the IMU integration unit further provides predicted poses to the tracking unit to facilitate the identification of the correspondence data. The filter unit also sends a most-updated state to the IMU integration unit to refine IMU measurements. Therefore, the tracking engine disclosed in the present disclosure is able to perform a precise, self-efficient tracking and localization for the user or a device.

Particular embodiments disclosed in the present disclosure further provide a mapping engine comprising a mapping unit. The mapping unit in the present disclosure retrieves a corresponding global map based on key points in the images sent from the tracking unit and the state of the user sent from the filter unit. The mapping unit may retrieve the corresponding map from an on-device storage or from a cloud periodically or based on demands, so that the tracking system may perform a global localization for the user in a cost-efficient way. In addition, the mapping unit disclosed in the present disclosure further builds or updates live maps or local maps based on the received key points in the images if needed. Furthermore, the mapping unit may send the mapped points, which are corresponding to the key points and the descriptors in the images, in the maps to an anchor interface for sharing with other users utilizing the same global map as a persistent anchor.

Figure 1:
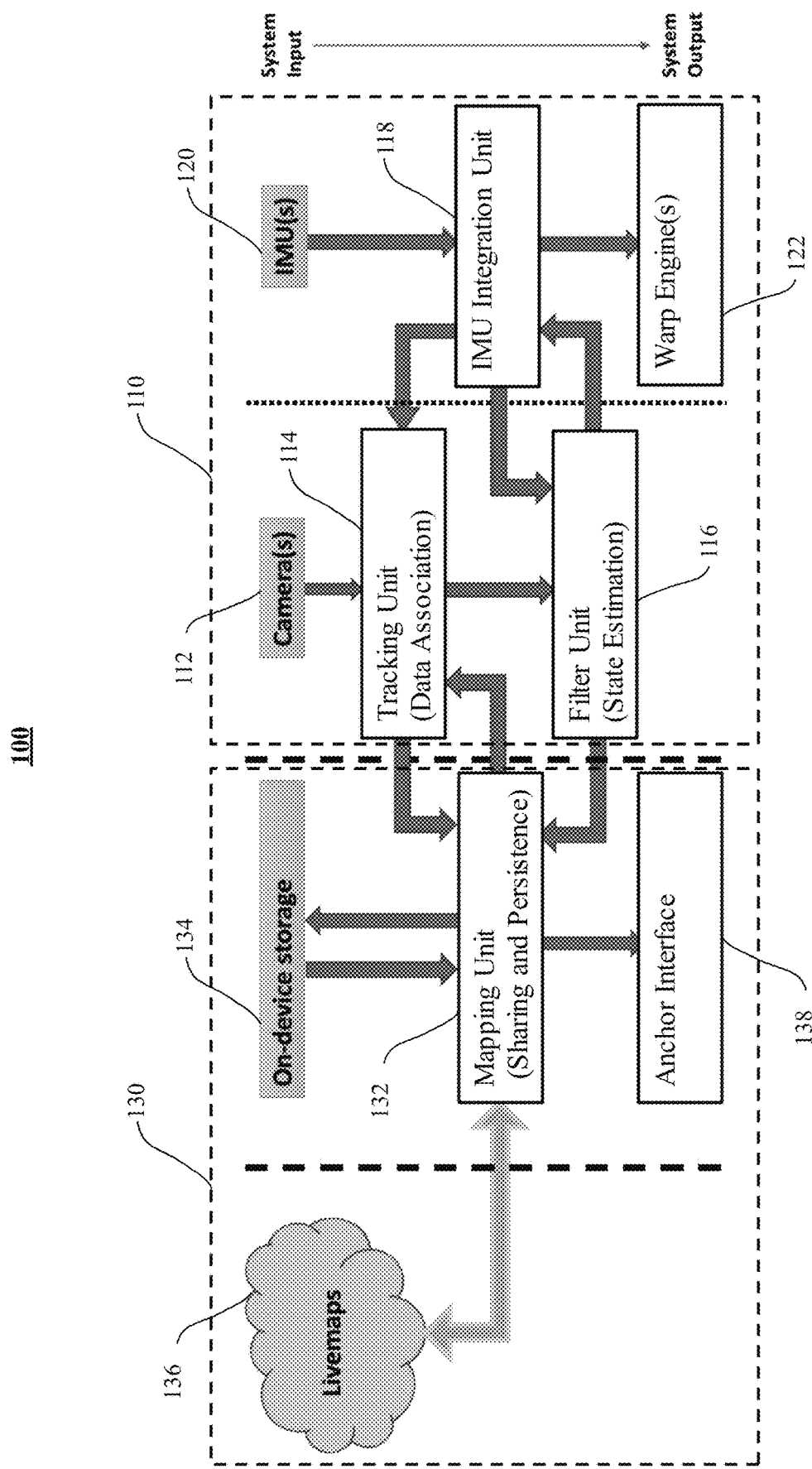
FIG. 1 illustrates an example diagram of a tracking system architecture.

FIG. 1 illustrates an example tracking system architecture, in accordance with certain embodiments. The tracking system 100 comprises a tracking engine 110 and a mapping engine 130. The tracking engine 110 comprises a tracking unit 114, a filter unit 116, and an IMU integration unit 118 to perform self-sufficient tracking and localization for a user in an environment. The mapping engine 130 comprises a mapping unit 132. The mapping unit 132 may interact with the tracking unit 114 and the filter unit 116 in the tracking engine 110 to trigger certain actions if needed. In particular embodiments, the actions performed at the mapping unit 132 may be further described in FIGS. 12 to 17. In particular embodiments, the mapping unit 132 may comprise an on-device storage 134 which stores one or more small, offline maps. In particular embodiments, the mapping unit 132 may read or retrieve live maps stored in a cloud 136 on demand or periodically. In particular embodiments, the mapping unit 132 may operate with an anchor interface 138 to send data over to one or more users, client system, networking system, third-party system, or any suitable system and network, in order to share and persist common data identified in the tracking system to be utilized via an application.

In FIG. 1, the IMU integration unit 118 receive raw IMU data from one or more IMUs 120 and process the raw IMU data to provide predicted poses of the user to the tracking unit 114 for guiding feature searching in images. The IMU integration unit 118 also process the raw IMU data to provide aggregated IMU measurements to the filter unit 116 for estimating a state of the user. Furthermore, the IMU integration unit 118 may send the processed IMU data to one or more warp engines 122 for late-stage warp, low-latency pose rendering, and image tracking aid. Detailed operations and actions performed at the IMU integration unit 118 may be further described in FIGS. 3-4D.

In FIG. 1, the tracking unit 114 receives one or more images captured by one or more cameras 112 and the predicted poses of the user from the IMU integration unit 118 to search related or common features in a series of the images. In particular embodiments, the tracking unit 114 may send correspondence data including identified features to the filter unit 116 for estimating a state of the user. Detailed operations and actions for providing the correspondence data performed at the tracking unit 114 may be further described in FIGS. 5-8. In particular embodiments, the tracking unit 114 of the tracking engine 110 may send identified features to the mapping unit 132 of the mapping engine 130 to retrieve a corresponding global map. Detailed operations and actions for providing a corresponding global map performed at the tracking unit 114 may be further described in FIGS. 10-13.

In FIG. 1, the filter unit 116 receives the correspondence data from the tracking unit 114 and receives the aggregated IMU measurements from the IMU integration unit 118. The filter unit 116 may estimate a state of the user based on the correspondence data and the aggregated IMU measurements. In particular embodiments, the state of the user may comprise a pose of the user relative to an environment which is built based on the images captured by the cameras 112. Furthermore, the filter unit 116 may send state information of the user to the IMU integration unit 118 to refine or calibrate IMU measurements. In particular embodiments, the filter unit 116 may also send the state information and mapped points identified in the corresponding global map to the mapping unit 132 of the mapping engine 130 for building or updating the corresponding global map if needed. Detailed operations and actions performed at the filter unit 116 may be further described in FIGS. 9-14.

In particular embodiments, the tracking system 100 may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the tracking system. In the present disclosure, a user which is being tracked and localized by the tracking device may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the tracking system 100. In particular embodiments, the IMU integration unit 118, the tracking unit 114, and the filter unit 116 in the tracking engine 110 are located within a head-mounted device, and the mapping unit 132 in the mapping engine 130 is implemented in a local computing device separated from the head-mounted device. In particular embodiments, the IMU integration unit 118 is located within a head-mounted device, and the tracking unit 114, the filter unit 116, and the mapping unit 132 are implemented in a local computing device separated from the head-mounted device. The local computing device comprises one or more processors configured to implement the tracking unit 114, the filter unit 116, and the mapping unit 132. In one embodiment, each of the processors is configured to implement the tracking unit 114, the filter unit 116, and the mapping unit 132 separately.

This disclosure contemplates any suitable network to connect each element in the tracking system 100 or to connect the tracking system 100 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 2:
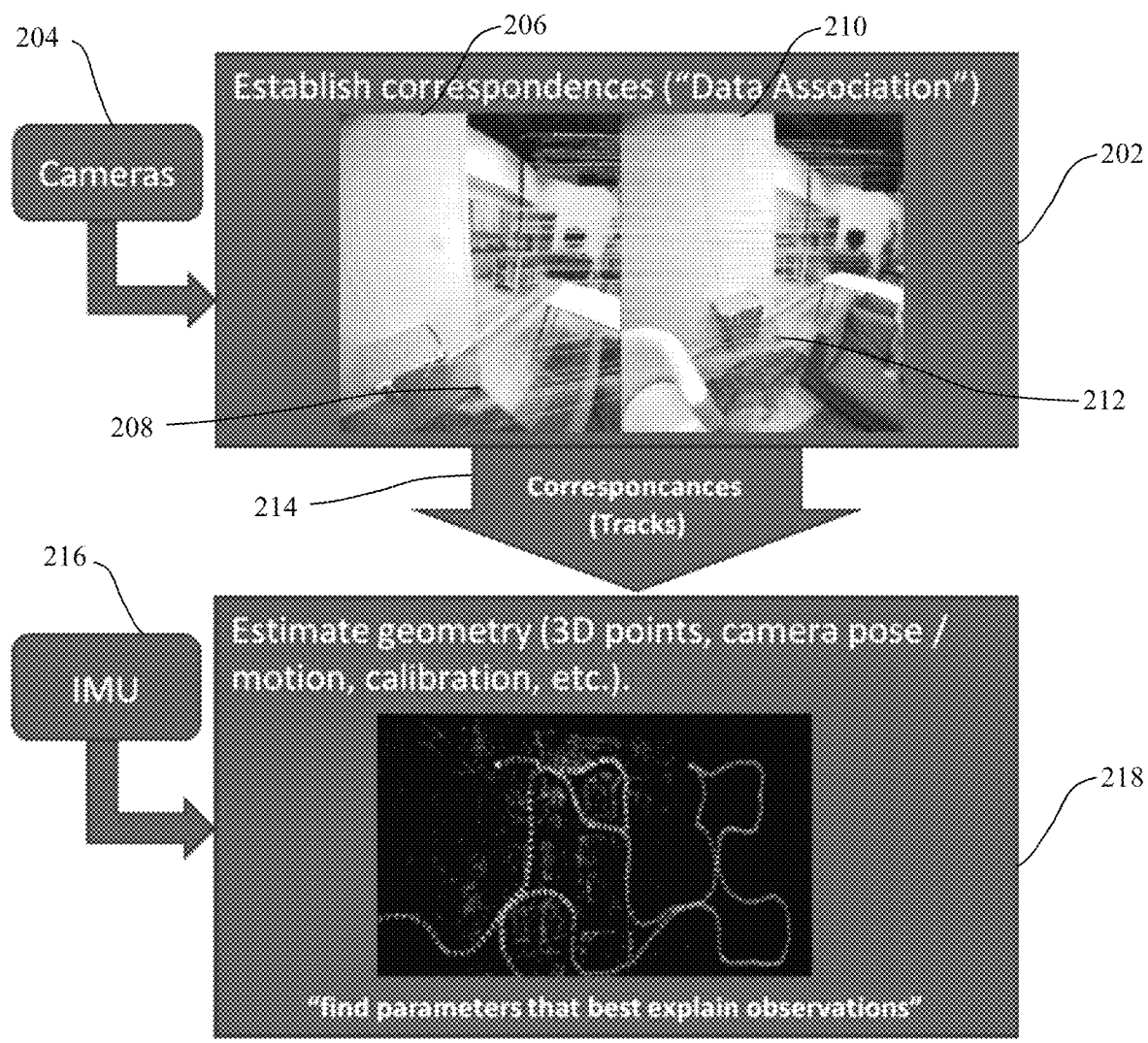
FIG. 2 illustrates an embodiment of a method for generating current state information.

FIG. 2 illustrates an embodiment of a method 200 for generating current state information, in accordance with certain embodiments. The method 200 comprises sending a series of images from cameras 204 to a tracking unit 202. The method 200 further comprises establishing, at the tracking unit 202, correspondences 214 in the series of images. For example, the tracking unit 202 identifies a first feature 208 in a first image 206 among the series of images, such as a corner of a carpet on the floor. The tracking unit 202 may then search a second feature 212 in a second image 210 among the series of images which is corresponding to the first feature 208, so that the tracking unit 202 may establish a correspondence 214 between the first feature 208 and the second feature 212. The method 200 additionally comprises receiving the correspondences 214 from the tracking unit 202 and aggregated IMU measurements from an IMU integration unit 216 at a filter unit 218. The method 200 further comprises generating current state information based on the received correspondences 214 and the aggregated IMU measurements. For example, the filter unit 218 estimates a state of a user based on 3D points identified in the images provided in the correspondences 214, and camera poses, velocity, acceleration and motion provided in the aggregated IMU measurements. In particular embodiments, the current state information may comprise a pose, and potentially a previous route, of the user relative to an environment built by the series of images captured by the cameras 204.

Figure 3:
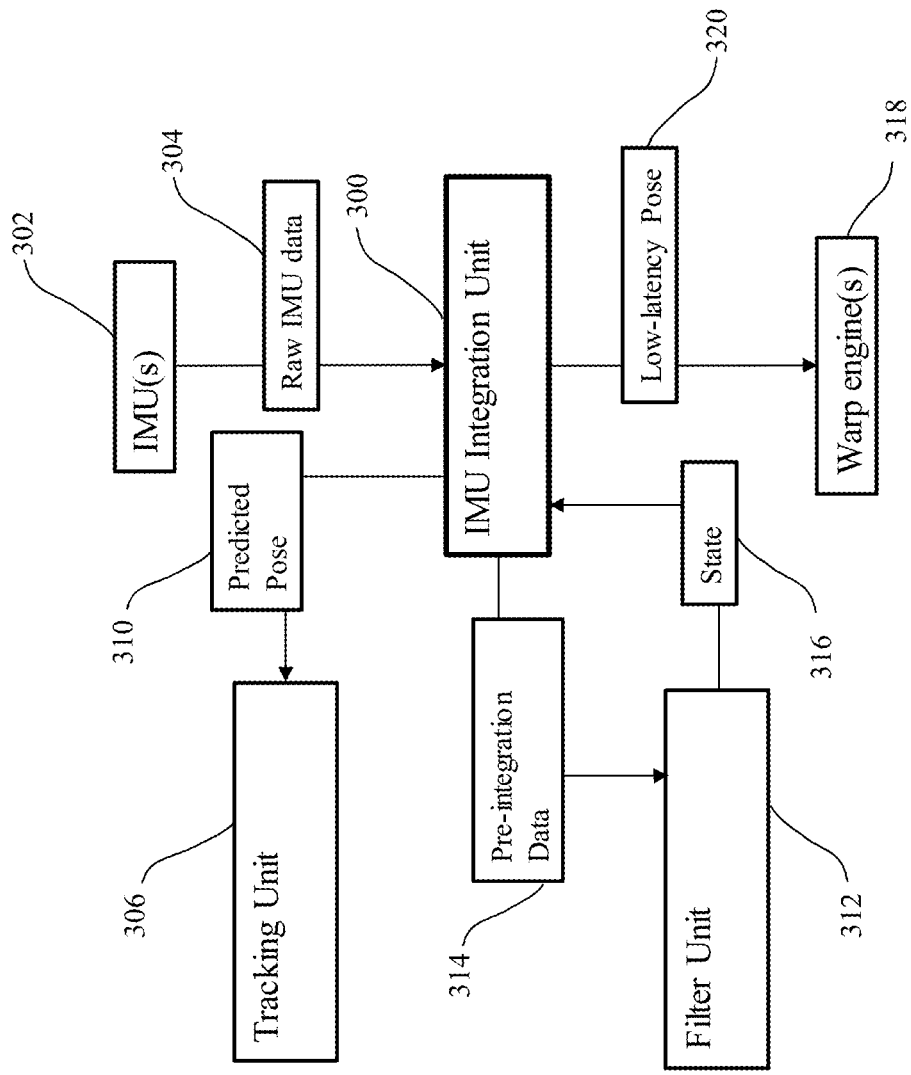
FIG. 3 illustrates an example diagram of an IMU integration unit processing data.

FIG. 3 illustrates an example diagram of an IMU integration unit 300 processing data, in accordance with certain embodiments. In particular embodiments, the IMU integration unit 300 may be implemented in a mobile device, which is separated from a mapping engine of the tracking system (not shown) implemented in a local device, as in a two-part system. For example, the IMU integration unit 300 may be critical in terms of time-delay, and therefore be implemented in a head-mounted device. The IMU integration unit 300 receives raw IMU data 304 from the IMU(s) 302 and process IMU measurements from the raw IMU data 304. The IMU integration unit 300 operates at a high frequency due to its lightweight compute and memory requirements. In particular embodiments, the IMU integration unit 300 may operate at 200-1000 Hz. In particular embodiments, the IMU integration unit 300 may operate on a static random-access memory (SRAM) which may be 10s of kb.

The IMU integration unit 300 integrates rotational velocity measurements to track an orientation of the user, integrates acceleration measurements to track velocity of the user, and furthermore, double-integrates rotational velocity and acceleration to track a position of the user. In particular embodiments, the IMU integration unit 300 determines predicted poses 310 of the user based on rotational velocity and specific forces detected from the user, e.g. body acceleration plus gravity in body frame, included in the raw IMU data 304. The IMU integration unit 300 sends the predicted poses 310 to a tracking unit 306 for assisting with feature search. The IMU integration unit 300 further aggregates one or more IMU measurements to provide pre-integration data 314 to a filter unit 312 for estimating a state 316 of the user. In particular embodiments, the IMU integration unit 300 may also receive the state 316 of the user from the filter unit 312 to calibrate its IMU measurements. Furthermore, the IMU integration unit 300 may send low-latency poses 320 to one or more warp engines 318 for late-stage warp. In particular embodiments, the low-latency pose 320 may be specific to a pose in a relatively short time period, for example, less than 0.5 second.

Figure 4C:
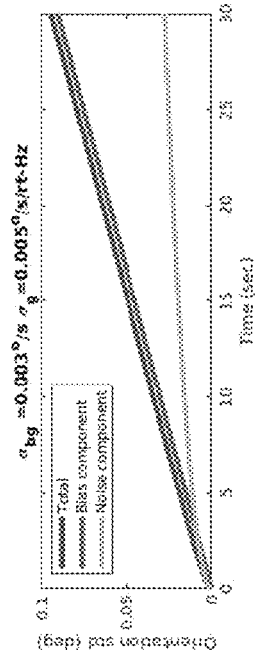
FIGS. 4A-4D illustrate example diagrams of orientation and position error standard deviation growth over different time periods.
Figure 4D:
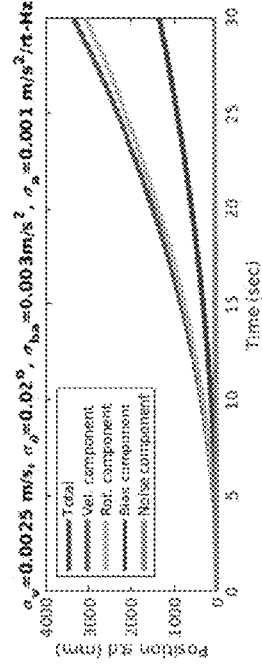
Figure 4A:
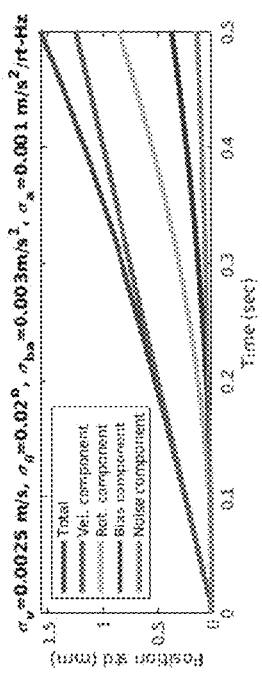
Figure 4B:
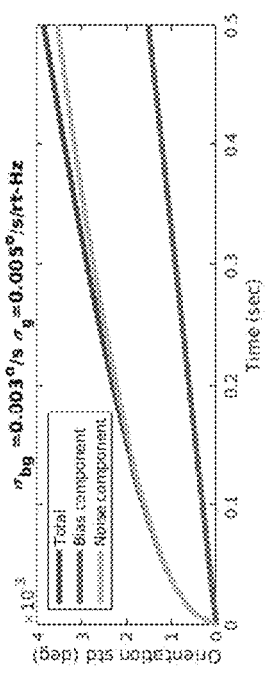

FIGS. 4A-4D illustrate example diagrams of orientation and position error standard deviation growth calculated by an IMU integration unit under various factors, in accordance with certain embodiments. In FIG. 4A, the IMU integration unit calculate position error standard deviation growth considering velocity, rotation, bias, and noise over a long-term time frame. In FIG. 4B, the IMU integration unit calculate orientation error standard deviation growth considering bias, and noise over a long-term time frame. In FIG. 4C, the IMU integration unit calculate position error standard deviation growth considering velocity, rotation, bias, and noise over a short-term time frame. In FIG. 4D, the IMU integration unit calculate orientation error standard deviation growth considering bias, and noise over a short-term time frame. Position error growth in the raw IMU data is superlinear and may be affected by noise, errors in an initial state estimation sent back from the filter unit. For a long-term pose tracking, the IMU measurements may be combined with visual measurements for aiding IMU measurements. For a short-term pose-tracking, errors are not significant so that may be used for late-stage warp and for aiding image tracking.

Figure 5:
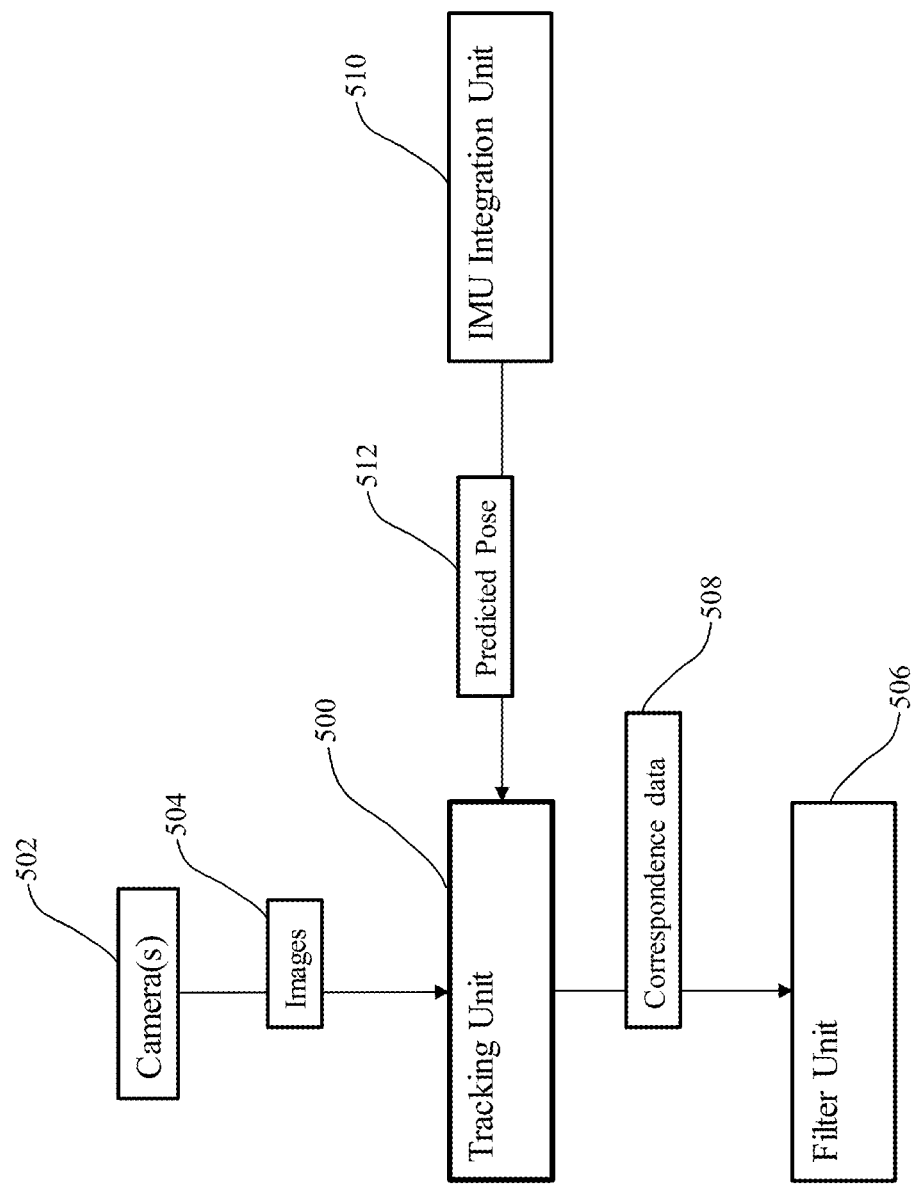
FIG. 5 illustrates an example diagram of a tracking unit processing data.

FIG. 5 illustrates an example diagram of a tracking unit 500 processing data, in accordance with certain embodiments. The tracking unit 500 receives multiple patches of images 504 from one or more cameras 502 and predicted poses 512 from an IMU integration unit 510. The tracking unit 500 determines corresponding features in a patch of images 504 with an aid of the predicted poses 512 to generate correspondence data 508. In particular embodiments, the patch of images may be a series of image taken in a period of time frame. In particular embodiments, a time interval between each of the images taken may be set. For example, each image in the series of images may be taken every millisecond. In particular embodiments, the correspondence data 508 may comprise feature track observations. In particular embodiments, the predicted poses 512 of the user may facilitate the tracking unit 500 in searching features in the images 504. In particular embodiments, the tracking unit 500 may operate at 5-10 Hz. In particular embodiments, the tracking unit 500 may operate on a static random-access memory (SRAM) which may be 1-4 MB.

Figure 6:
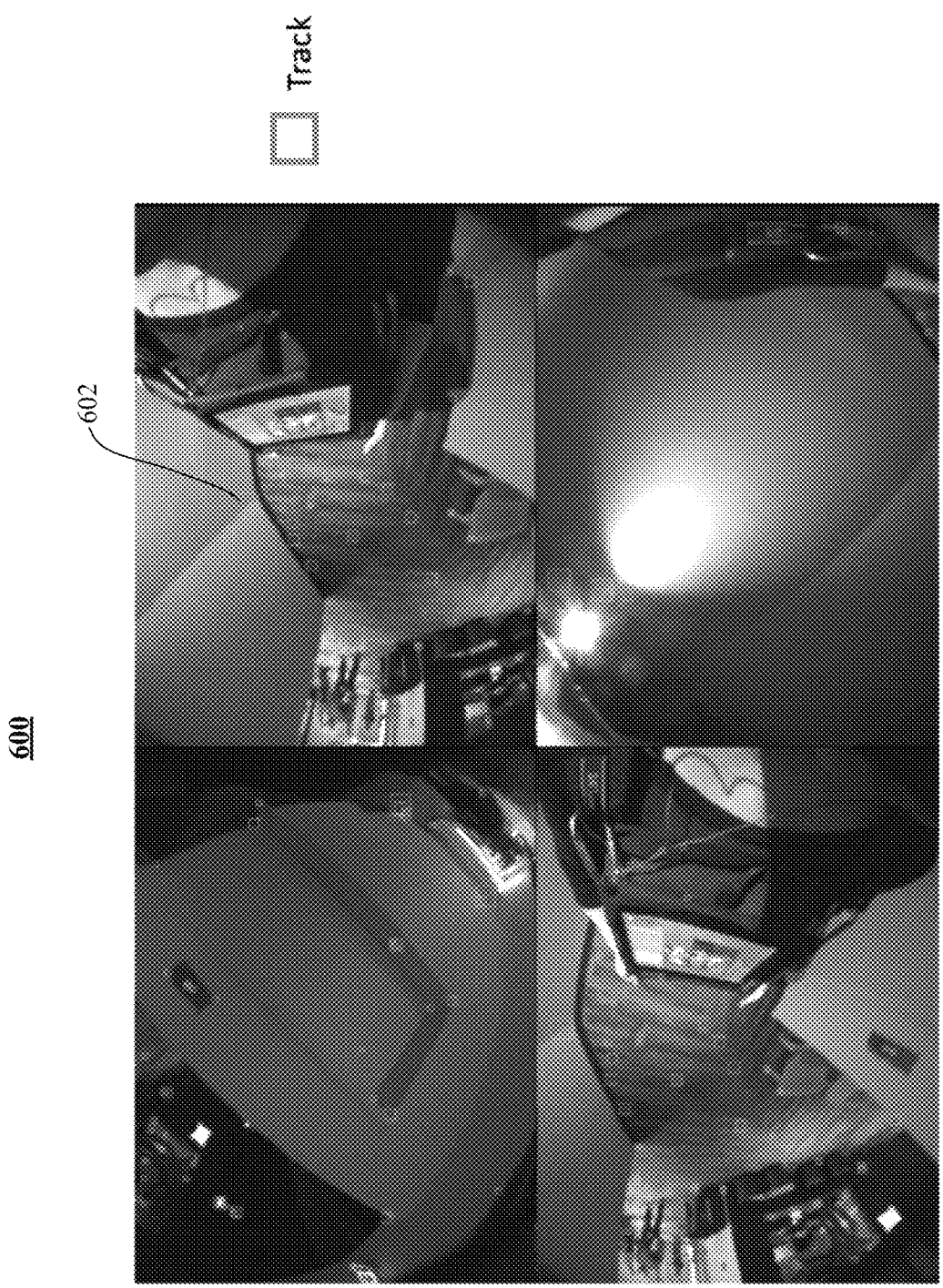
FIG. 6 illustrates an embodiment of a series of images processed by the tracking unit.

FIG. 6 illustrates an embodiment of a series of images processed by the tracking unit, in accordance with certain embodiments. The tracking unit 600 identifies one or more features 602 in images from frame to frame. In particular embodiments, the feature 602 may be a descriptor, a key point, a 3D point, or a map point. The tracking unit 600 extracts features 602 in an environment on multiple levels. For example, the tracking unit 600 may extract features 602 while implementing streaming and supporting multiple regions of interest (ROIs) per image or per the series of images. Furthermore, the tracking unit 600 may utilize non-maximal suppression, local ranking, and image-noise-based adaptive thresholding in feature extraction. Optionally, descriptors may be extracted to be used for map matching, map building, and relocation of the user, and as patches for a subsequent search at the tracking unit 600. In particular embodiments, the descriptor may be Oriented FAST and Rotated BRIEF (ORB) and Fast Retina Keypoint (FREAK) adapted for lens distortion.

Figure 7:
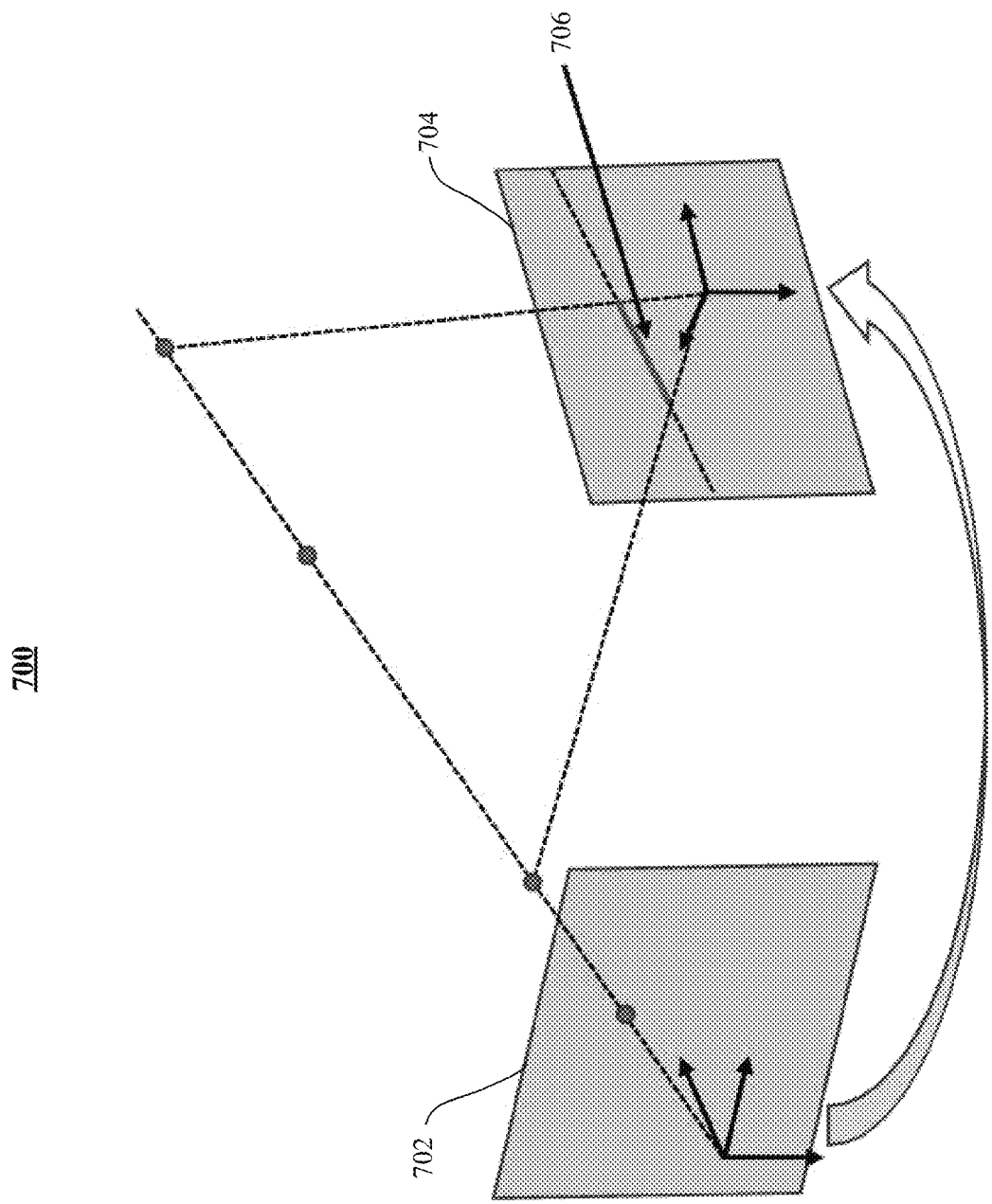
FIG. 7 illustrates an embodiment of feature tracking process at the tracking unit.

FIG. 7 illustrates an embodiment of feature tracking process 700 at the tracking unit, in accordance with certain embodiments. The tracking unit may track features in a series of images from frame to frame, for example, from a first frame 702 to a second frame 704. The tracking unit may search area based on camera rotation and translation estimation from the IMU integration unit and the filter unit to define a search region 706. In particular embodiments, the search region 706 may be an epipolar line segment.

Figure 8:
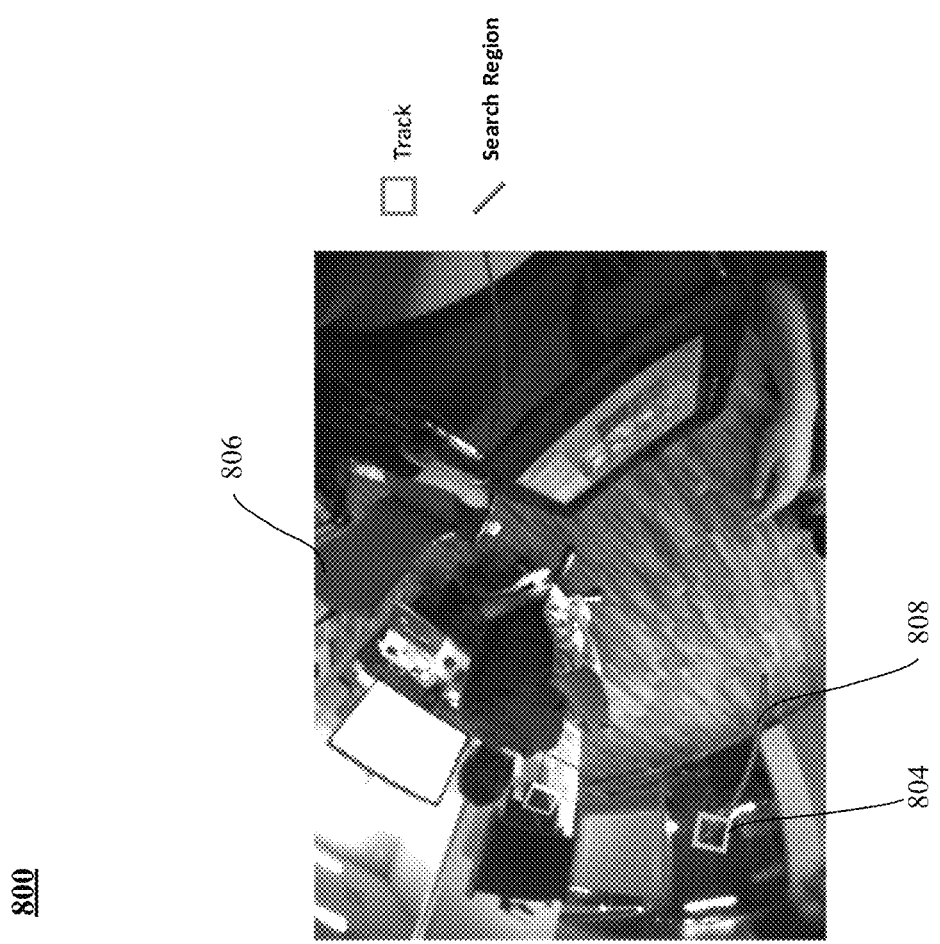
FIG. 8 illustrates an embodiment of a series of images with tracked features.
Figure 8:
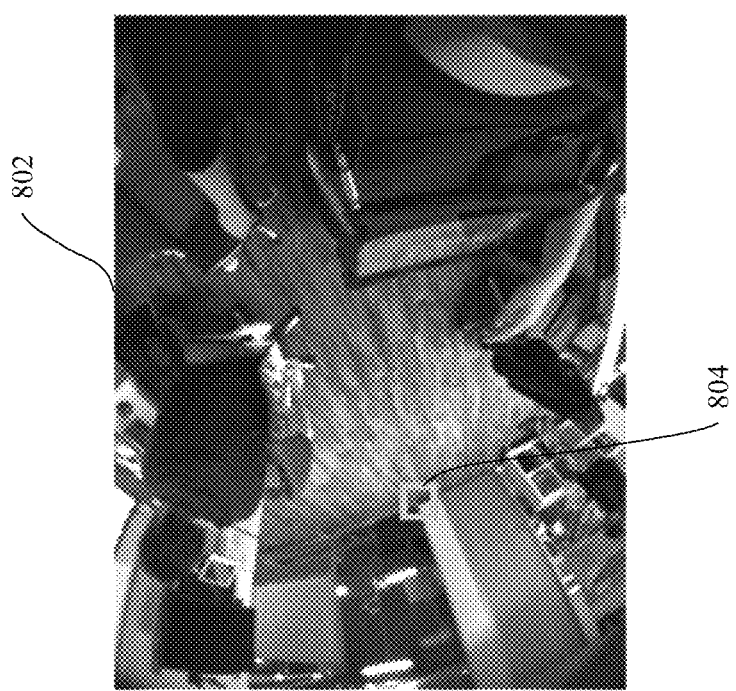

FIG. 8 illustrates an embodiment of a series of images with tracked features, in accordance with certain embodiments. The tracking unit may search area and then perform a local iterative refinement. The tracking unit identifies a feature 804 in a first image 802 and determine a search region 808 to track the feature 804 in a second image 806. For each feature, image patches are maintained in 3 pyramid levels and a 1-D inverse-depth filter. The inverse-depth filter and the motion prior from the IMU integration unit and the filter unit is used for guided epipolar-line search. For each subsequent image, the patch is warped, and a scale-invariant SSD area-search is used to find a best match. In particular embodiments, the tracking unit may generate a best match refined by Kanade-Lucas-Tomasi (KLT) iterations.

Figure 9:
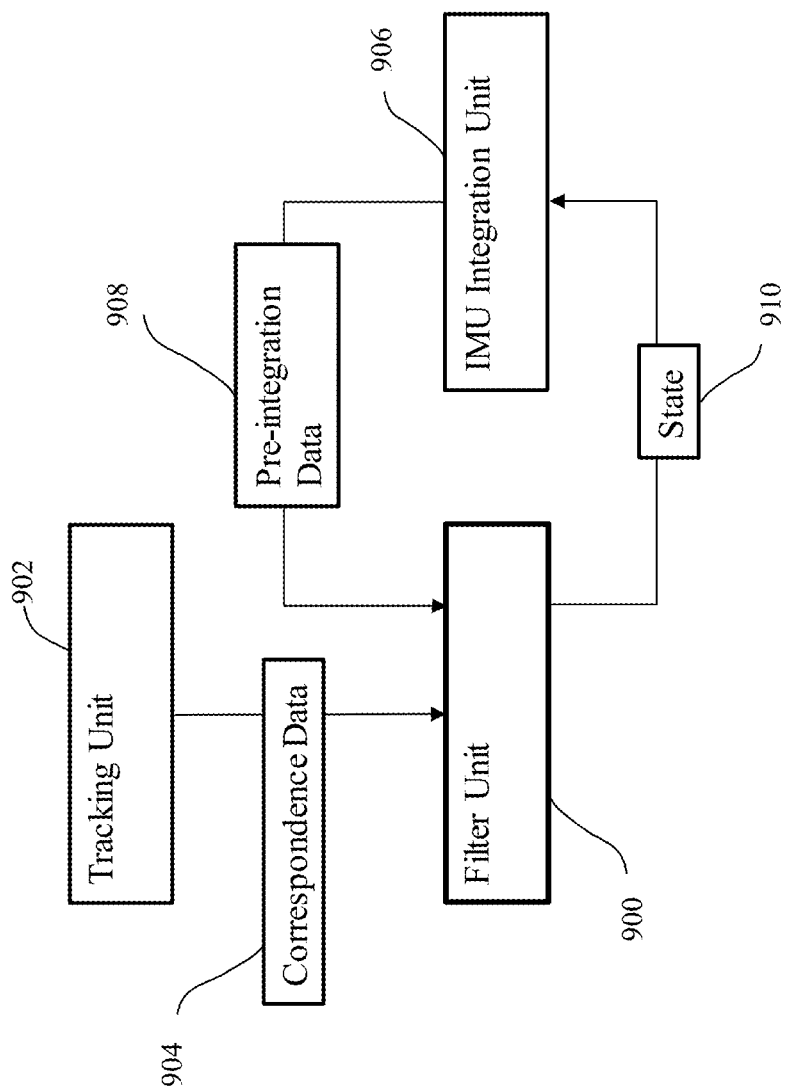
FIG. 9 illustrates an example diagram of the filter unit interacting with the IMU integration unit and the tracking unit.

FIG. 9 illustrates an example diagram of a filter unit 900 interacting with the IMU integration unit 906 and the tracking unit 902, in accordance with certain embodiments. The filter unit 900 receives pre-integration data 908 from an IMU integration unit 906 and receives correspondence data 904 from a tracking unit 902. The filter unit 900 determines a state of the user based on the correspondence data 904 and the pre-integration data 908. In particular embodiments, the state of the user may comprise a pose of the user relative to an environment built by images collected and processed by the tracking unit 902. The pose of the user may be determined by IMU measurements in the pre-integration data 908 and a difference between tracked features identified in the correspondence data 904. Furthermore, the filter unit 900 sends the state of the user back to the IMU integration unit 906 for adjustment or refinement of the IMU measurements. In particular embodiments, the filter unit 900 sends an initial state of the user back to the IMU integration unit 906 to be used in IMU calibration. In particular embodiments, the filter unit 900 may operate at 5-10 Hz. In particular embodiments, the filter unit 900 may operate on a static random-access memory (SRAM) which may be 1-4 MB.

The filter unit 900 operates tightly with the tracking unit 902 and the IMU integration unit 906 and estimates the state of the user coupled with the pre-integration data 908 and vision measurements. Therefore, the filter unit 900 may improve robustness and accuracy and provide reliable uncertainty estimates. The state of the user may contain a configurable selection of: current pose and velocity, sliding window of past poses, positions of a subset of currently visible features, pose of map anchors for hosting visible map-features or for being used in rendering, and calibration parameters. In particular embodiments, the pose of map anchors may be used for rendering a virtual tag/object. Detailed demonstrations regarding map anchors may be further described in FIG. 10. In particular embodiments, the calibration parameter may comprise IMU biases, scale factors, non-orthogonality, g-sensitivity, camera intrinsics, sensor transforms, and sensor time offsets. The filter unit 900 may also implement online calibration, so that the filter unit 900 may allow tracking changes due to temperature, aging, shock, and/or flexible structure, and further improve robustness and reduce drift.

Figure 10:
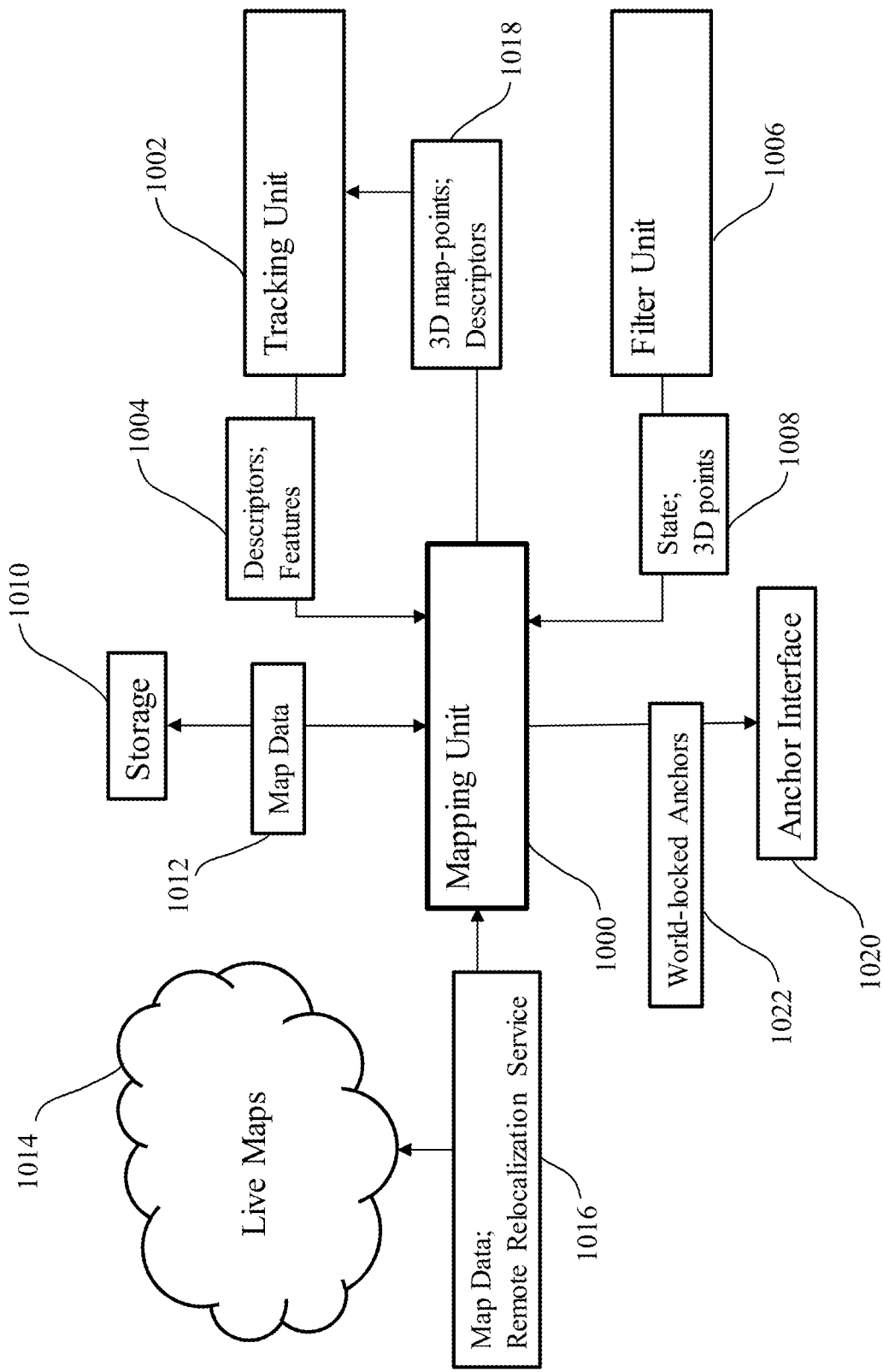
FIG. 10 illustrates an example diagram of a mapping engine architecture interacting with the tracking engine.

FIG. 10 illustrates an example diagram of a mapping engine architecture interacting with the tracking engine, in accordance with certain embodiments. The mapping engine comprises a mapping unit 1000. The mapping unit 1000 receives descriptors and features 1004 identified in images from a tracking unit 1002 and retrieves a corresponding map based on the descriptors and features 1004. In particular embodiments, the mapping unit 1000 may also receive state information of the user, and potentially, 3D points 1008 determined using triangulation from a filter unit 1006 to assist with the retrieval of the corresponding map. The corresponding map may be a regional local map or a global map. In particular embodiments, the mapping engine may comprise the mapping unit 1000, a storage 1010, and an anchor interface 1020. The storage 1010 may be an on-device storage implemented in the mapping unit 1000 and store small, local maps. In particular embodiments, the mapping unit 1000 may connect to a cloud server 1014 to retrieve map data 1016, such as live maps, as needed. The cloud server 1014 may also provide certain online services for the mapping unit 1000 if needed, for example, a remote relocalization service 1016. The mapping unit 1000 sends the retrieved map with 3D map points and descriptors 1018 back to the tracking unit 1002 for data association. Furthermore, the mapping unit 1000 may send anchors identified based on the descriptors and features 1004 in the images, to an anchor interface 1020 for share and persistence as an anchor in maps.

The mapping unit 1000 may retrieve map data at two levels. For a first level of map-data retrieval, the first level of the map-data retrieval is performed between the mapping unit 1000 and the cloud server 1014. The cloud server 1014 stores a global map and the mapping unit 1000 stores a smaller, local map, e.g. stored in the on-device storage 1010. The mapping unit 1000 may download local map data based on the images and/or matched descriptors 1004 sent by the tracking unit 1002. In particular embodiments, the mapping unit 1000 or a client device implanted with the tracking system may download map data based on GPS data. For a second level of map-data retrieval, the second level of the map-data retrieval is performed between the mapping unit 1000 and the tracking unit 1002. The mapping unit 1000 sends 3D map-points and descriptors 1018 to the tracking unit 1002, and the tracking unit 1002 determines the user's location relative to the descriptors 1018. In particular embodiments, when the mapping unit 1000 receives the descriptors 1004 from the tracking unit 1002, the mapping unit 1000 may perform a matching for the descriptors 1004 and send the matched 3D map-points 1018 back to the tracking unit 1002. In particular embodiments, the mapping unit 1000 may send 3D-map points 1018 based on the state 1008 of the user sent by the filter unit 1006. For example, if the user is looking at a particular region in a map, corresponding 3D map-points 1018 in the map will be sent to the tracking unit 1002.

Figure 11:
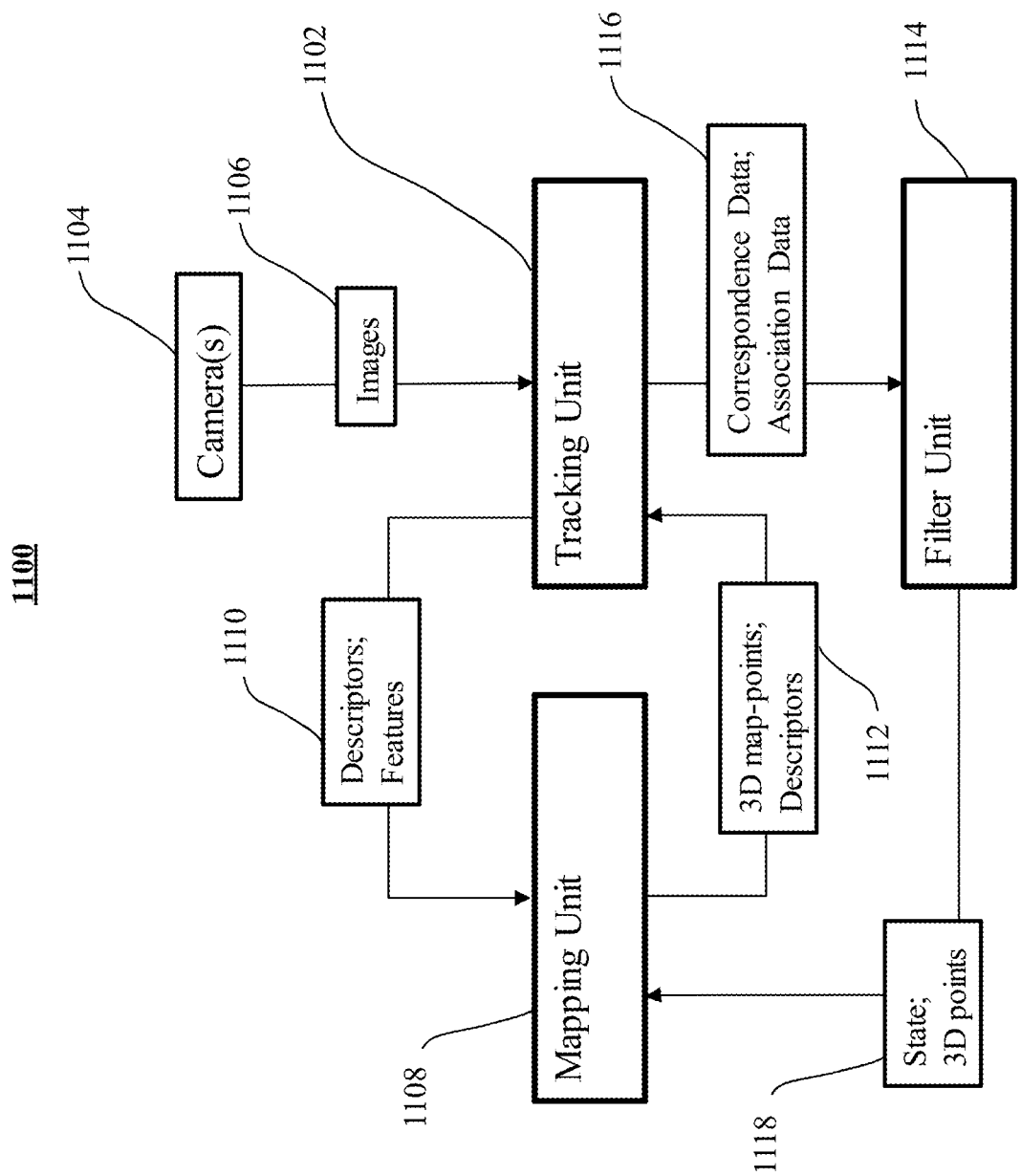
FIG. 11 illustrates an example diagram of a method for a global localization of the user.

FIG. 11 illustrates an example diagram of a method 1100 for a global localization of the user, in accordance with certain embodiments. The method 1100 receives images 1106 from cameras 1104 at a tracking unit 1102. The method 1100 identifies descriptors and features 1110 in the images 1106 at the tracking unit 1102. In addition, the method 1100 also determines correspondences between each feature 1110 and sends correspondence data 1116 to a filter unit 1114 to determine a state 1118 of the user. In particular embodiments, the filter unit 1114 determines 3D points 1118 using triangulation. The method 1100 receives the descriptors and features 1110 and the state and 3D points 1118 from the tracking unit 1102 and the filter unit 1114 respectively at the mapping unit 1108. The method 1100 retrieves a corresponding global map based on the descriptors and features 1110 and the state and 3D points 1118 and sends the corresponding global map including 3D map-points and descriptors 1112 from the mapping unit 1108 to the tracking unit 1102. The method 1100 associates the 3D map-points and descriptors 1112 in the corresponding global map with descriptors and features 1110 in the images 1106 and sends association data 1116 to the filter unit 1114 for a global localization of the user.

Figure 12:
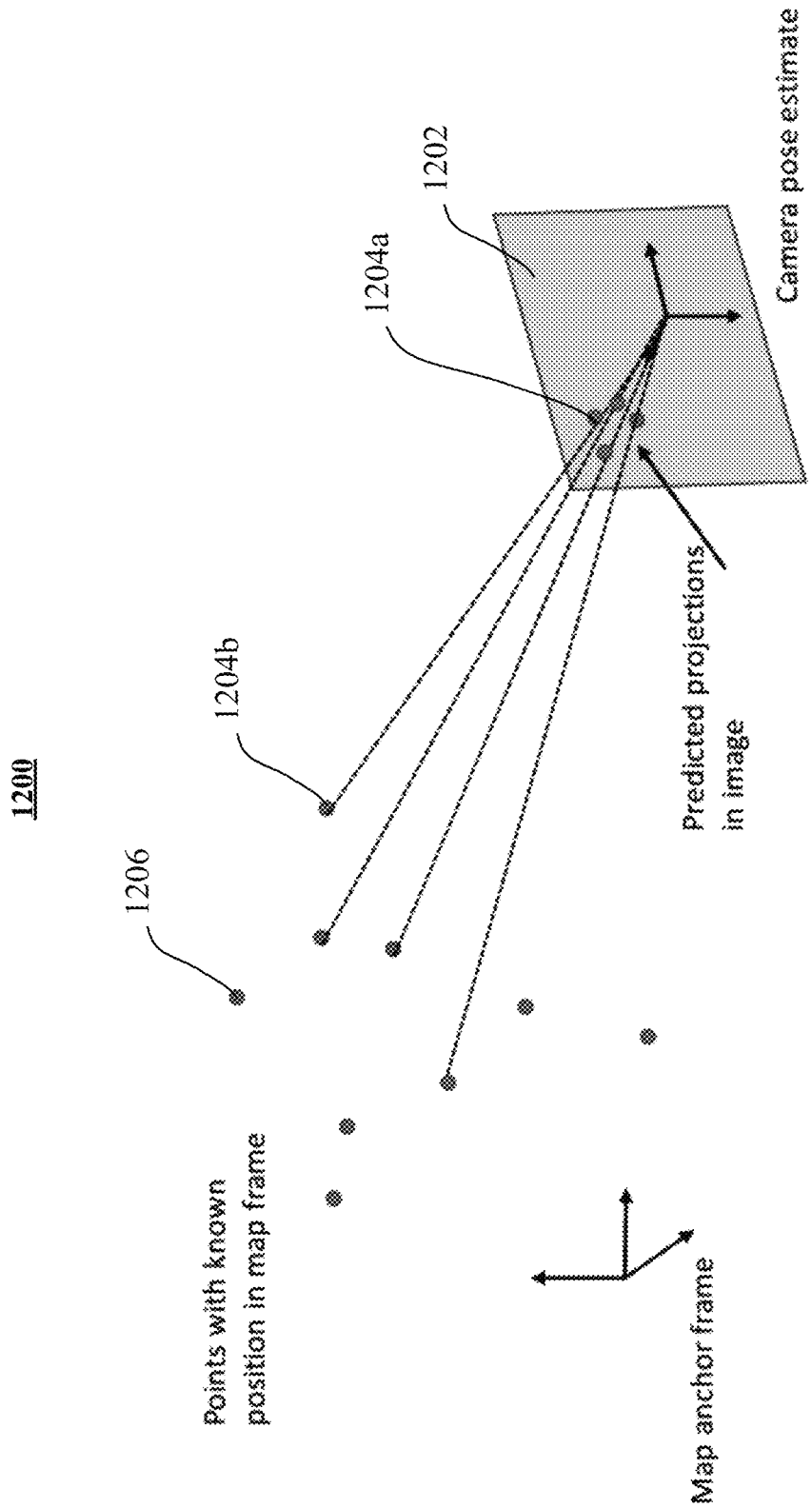
FIG. 12 illustrates an embodiment of associating map points in a global map with determined point in the images.

FIG. 12 illustrates an embodiment of a method 1200 for associating map points in a global map with determined point in the images, in accordance with certain embodiments. The method 1200 associates determined points 1204a in an image 1202 with points 1204b, 1206 in the global map. In particular embodiments, the determined points 1204a may be determined based on camera pose estimation. In particular embodiments, the points 1204b, 1206 may be points with known position in a map frame. In particular embodiments, the method 1200 associates the point 1204a in the image 1202 with the point 1204a by predicting projections in the image 1202. In particular embodiments, the tracking unit tracks matched features by patch matching in following map frames.

Figure 13:
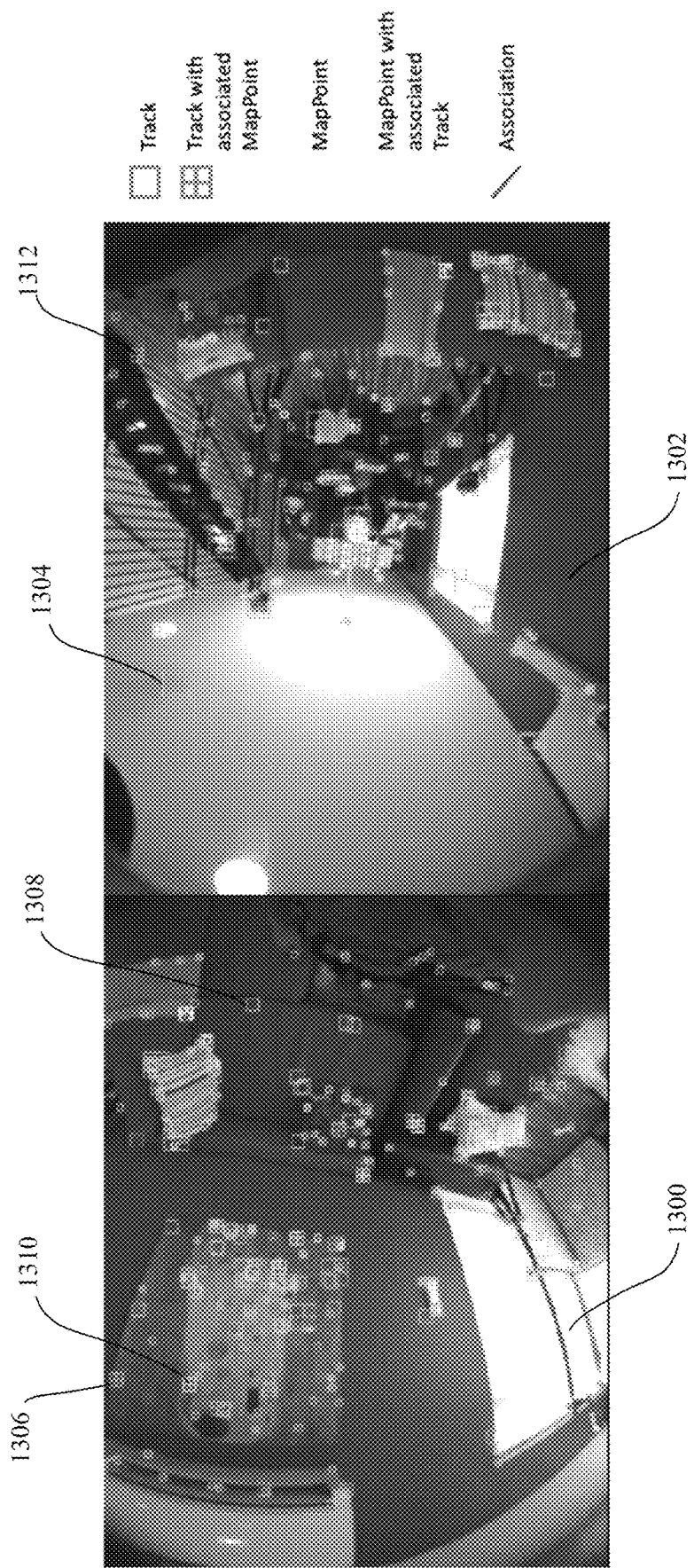
FIG. 13 illustrates an example diagram of the tracking unit generating association data.

FIG. 13 illustrates an example diagram of the tracking unit generating association data, in accordance with certain embodiments. The tracking unit processes a series of images and associates features in the images with descriptors in a global map. In FIG. 13, a first image 1300 and a second image 1302 are images from different time frames. The first image 1300 and the second image 1302 both comprise processed, e.g. tracked, features 1304 in the images identified by the tracking unit. The tracking unit then receive the global map including map points 1308 from a mapping unit. The tracking unit associates the features 1304 with the map points 1308 and generates features with associated map point 1306 and map points with associated features 1310. The tracking unit determines associations 1312 between the features with associated map point 1306 and the map points with associated features 1310, and sends association data to a filter unit.

Figure 14:
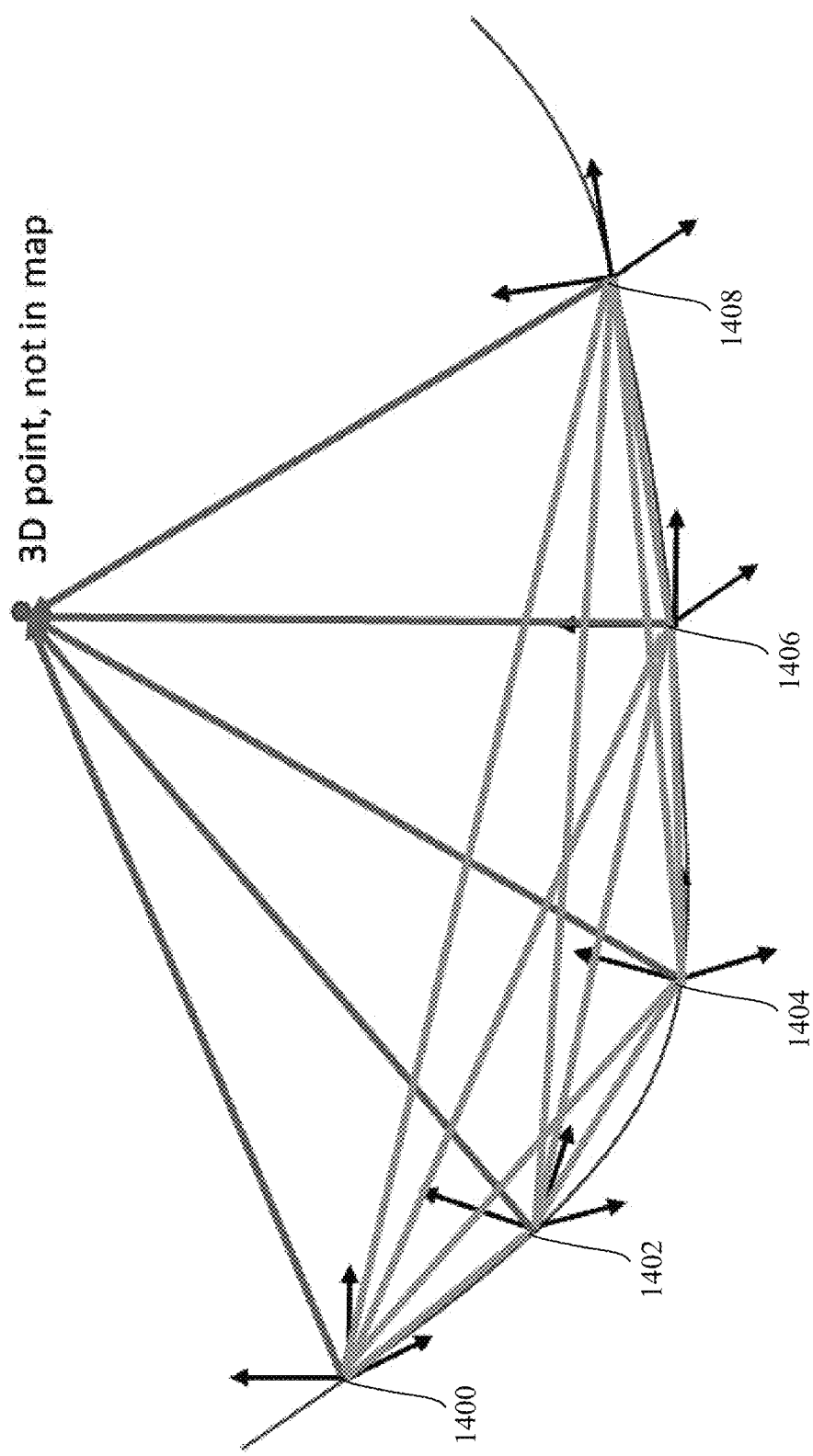
FIG. 14 illustrates an embodiment of a method of performing triangulation between a sequence of poses and the matched map points.

FIG. 14 illustrates an embodiment of a method of performing triangulation between a sequence of poses and matched map points, in accordance with certain embodiments. The filter unit positions a user relative to an environment or in a map based on the matched points 1400, 1402, 1404, 1406, 1408 in images by triangulation. In particular embodiments, the filter unit utilizes 3D points, e.g. the matched points 1400, 1402, 1404, 1406, 1408, to refine state information of the user. The matched points 1400, 1402, 1404, 1406, 1408 may be in the map provided by the mapping unit or in the images provided by the tracking unit. The filter unit processes feature measurements by imposing constraints on a slide window of poses at cost linear in the number of features. In particular embodiments, the filter unit may prevent drift and reduces computation when hovering over a scene for small number of in-state features. In particular embodiments, the mapped 3D position may be used as additional measurements to unmodelled correlations.

Figure 15:
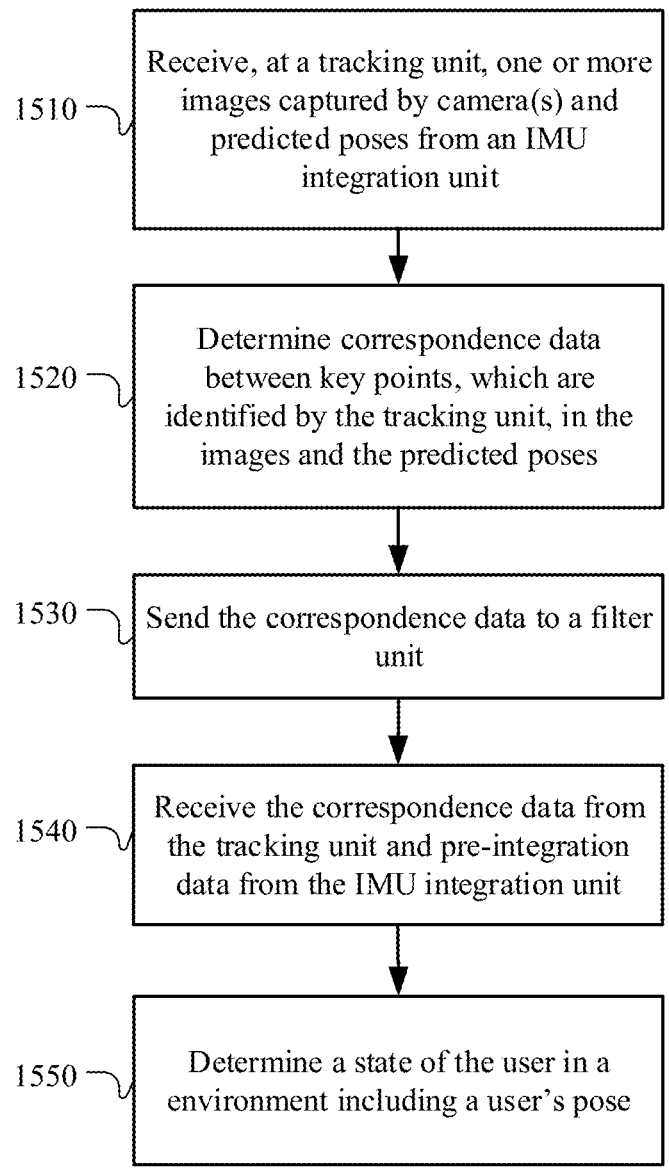
FIG. 15 illustrates an embodiment of a method performed at the tracking engine for continuously tracking a user in a local map.

FIG. 15 illustrates an example method 1500 for generating a current state of a user/device based on the received images and the predicted poses at the tracking engine of the tracking system, in accordance with certain embodiments. The tracking engine of the tracking system may be provided to or displayed on any computing system (e.g., an end user's device, such as a smartphone, virtual reality system, gaming system, etc.). The method 1500 may begin at step 1510 receiving one or more images and predicted poses. In particular embodiments, the tracking system comprises a tracking engine which includes a tracking unit to receive images, motion data, and any suitable data which may be used to assist with localization and mapping. In particular embodiments, the images may be captured by camera(s), such as a still camera and a video camera. The images may be a series of images taken continuously or separately by a certain period of time. The tracking engine of the tracking system may comprise an IMU integration unit which processes raw IMU data from IMU(s) to provide the predicted poses to the tracking unit. In particular embodiments, the IMU integration unit may measure rotational velocity and specific force of the user based on the raw IMU data captured by multiple IMUs to calculate motion data of the user.

At step 1520, the method 1500 may determine correspondence data between key points in the images and the predicted poses. In particular embodiments, the method 1500 may execute the tracking system to determine the correspondence data between key points in the images and the predicted poses. In particular embodiments, the tracking unit of the tracking engine in the tracking system may determine the correspondence data based on corresponding features in a sequence of images. In particular embodiments, the tracking system may identify a first feature in a first image of the sequence of images and search, in a second image of the sequence of images, for a second feature that corresponds to the first feature in the first image. In particular embodiments, searching features in the images may be performed along an epipolar line segment determined using the predicted pose.

At step 1530, the method 1500 may send the correspondence data to a filter unit of the tracking engine in the tracking system. In particular embodiments, the method 1500 may execute the tracking system to send the correspondence data from the tracking unit to the filter unit of the tracking engine, or any suitable processor which may integrate data from camera(s) and IMU(s).

At step 1540, the method 1500 may receive the correspondence data at the filter unit of the tracking engine in the tracking system. In particular embodiments, the filter unit may receive the correspondence data from the tracking unit and also receive pre-integration data from the IMU integration unit. In particular embodiments, the pre-integration data sent from the IMU integration unit may comprise aggregated IMU measurements, such as adjusted IMU measurements by calculating position error based on an initial state estimation.

At step 1550, the method 1500 may determine a state of the user in an environment including a user's pose at the filter unit of the tracking engine in the tracking system. In particular embodiments, the filter unit may determine current state information based on the correspondence data and the motion data. The current state information may comprise a current pose of the user relative to the environment captured by the camera(s). In particular embodiments, the filter unit may further send the current state information to the IMU integration unit to be used to generate a next predicted pose of the user. The current state information may comprise a current pose and velocity of the user and IMU calibration data. In particular embodiments, the filter unit may determine the current state information using an optimization algorithm. In particular embodiments, the IMU integration unit may operate at a higher frequency than the tracking unit and the filter unit. For example, the IMU integration unit may operate at 200-1000 Hz, and the tracking unit and the filter unit may operate at 5-10 Hz.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for local localization including the particular steps of the method of FIG. 15, this disclosure contemplates any suitable method for local localization including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Figure 16A:
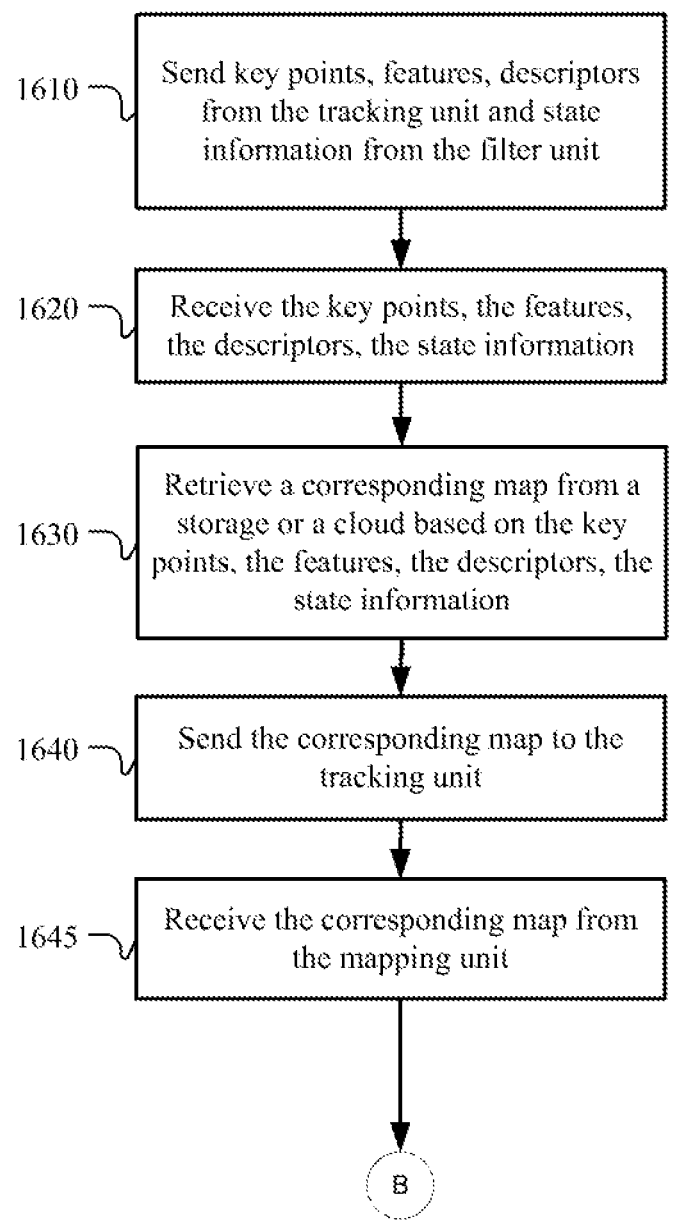
FIG. 16A illustrates an embodiment of a method performed between the tracking engine and the mapping engine to retrieve a global map based on the local map.

FIG. 16A illustrates an example method 1600 for retrieving a global map from the mapping engine based on the local map, in accordance with certain embodiments. The mapping engine of the tracking system may be provided to or displayed on any computing system (e.g., an end user's device, such as a smartphone, virtual reality system, gaming system, etc.). The mapping engine of the tracking system may also be provided to a local device which may be separated from the tracking engine of the tracking system. In particular embodiments, the mapping unit may be set in a local device separated from the IMU integration unit which is located in a head-mounted device. The method 1600 may begin at step 1610 sending key points, features, descriptors from the tracking unit. In particular embodiments, the descriptors may be associated with the key points and/or features. Furthermore, the method 1600 may also send the state information from the filter unit. In particular embodiments, the state information may be the most updated state information of the user.

At step 1620, the method 1600 may receive the key points, features, descriptors, and state information at the mapping unit of the mapping engine in the tracking system.

At step 1630, the method 1600 may retrieve a corresponding map from a storage or a cloud based on the key points, features, descriptors, and state information. In particular embodiments, the corresponding map may be retrieved from an on-device storage. In particular embodiments, the corresponding map may be retrieved from live maps in the cloud or a local server.

At step 1640, the method 1600 may send the corresponding map to the tracking unit. In particular embodiments, the corresponding map may comprise 3D map points which are identified based on the key points, features, descriptors, and state information.

At step 1645, the method 1600 may receive the corresponding map at the tracking unit from the mapping unit. In particular embodiments, the mapping unit may be configured to operate on demand or at a lower frequency than the IMU integration unit, the tracking unit, and the filter unit. In particular embodiments, the mapping unit may operate at 0-2 Hz.

Figure 16B:
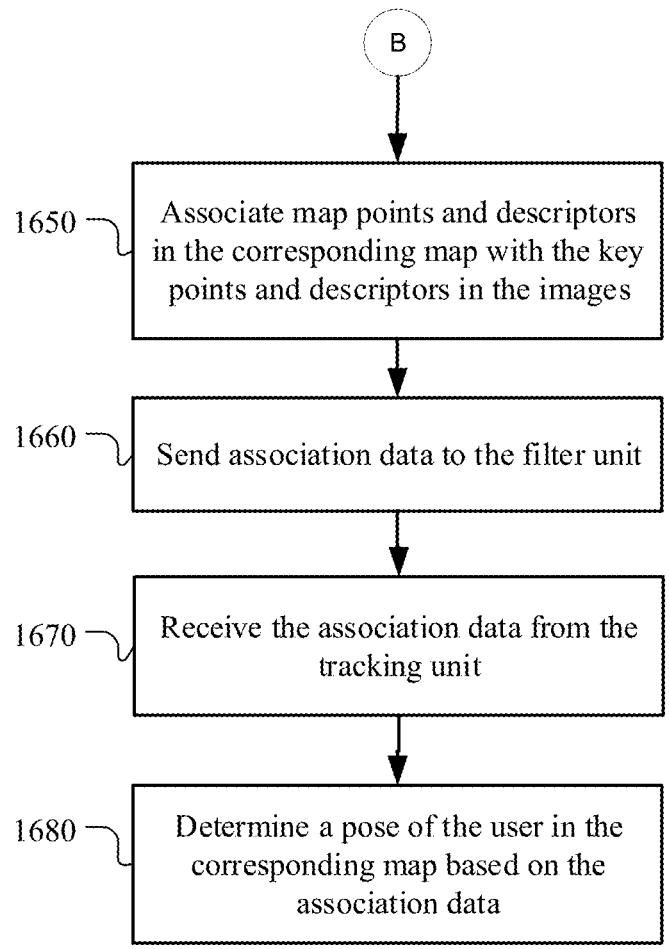
FIG. 16B illustrates an embodiment of a method performed at the tracking engine for associating a user in the local map with the global map.

FIG. 16B illustrates an example method 1601 for associating the user in the local map with the global map, in accordance with certain embodiments. In particular embodiments, the method 1601 may perform the association when receiving the corresponding map from the mapping unit at the tracking unit. The method 1601 may begin at step 1650 associating the map points in the received corresponding map with the key points and descriptors in the images.

At step 1660, the method 1601 may send association data to the filter unit of the tracking engine. The association data may comprise matched map points which are determined based on the association between the map points and the key point and descriptors.

At step 1670, the method 1601 may receive the association data from the tracking unit at the filter unit of the tracking engine.

At step 1680, the method 1601 may determine a pose of the user in the corresponding map based on the association data. In particular embodiments, the filter unit may update the pose of the user in the global map, which is the received corresponding map, and localize the user in the global map based on the association data. In particular embodiments, the updated state information may further comprise a current position of the user relative to a three-dimensional map. Furthermore, the filter unit may perform triangulation between a sequence of poses and the matched map points in the association data to refine state information of the user.

Particular embodiments may repeat one or more steps of the methods of FIG. 16, where appropriate. Although this disclosure describes and illustrates particular steps of the methods of FIG. 16 as occurring in a particular order, this disclosure contemplates any suitable steps of the method of FIG. 16 occurring in any suitable order. Moreover, although this disclosure describes and illustrates an example method for global localization including the particular steps of the method of FIG. 16, this disclosure contemplates any suitable method for global localization including any suitable steps, which may include all, some, or none of the steps of the methods of FIG. 16, where appropriate. Furthermore, although this disclosure describes and illustrates particular components, devices, or systems carrying out particular steps of the methods of FIG. 16, this disclosure contemplates any suitable combination of any suitable components, devices, or systems carrying out any suitable steps of the methods of FIG. 16.

Figure 17:
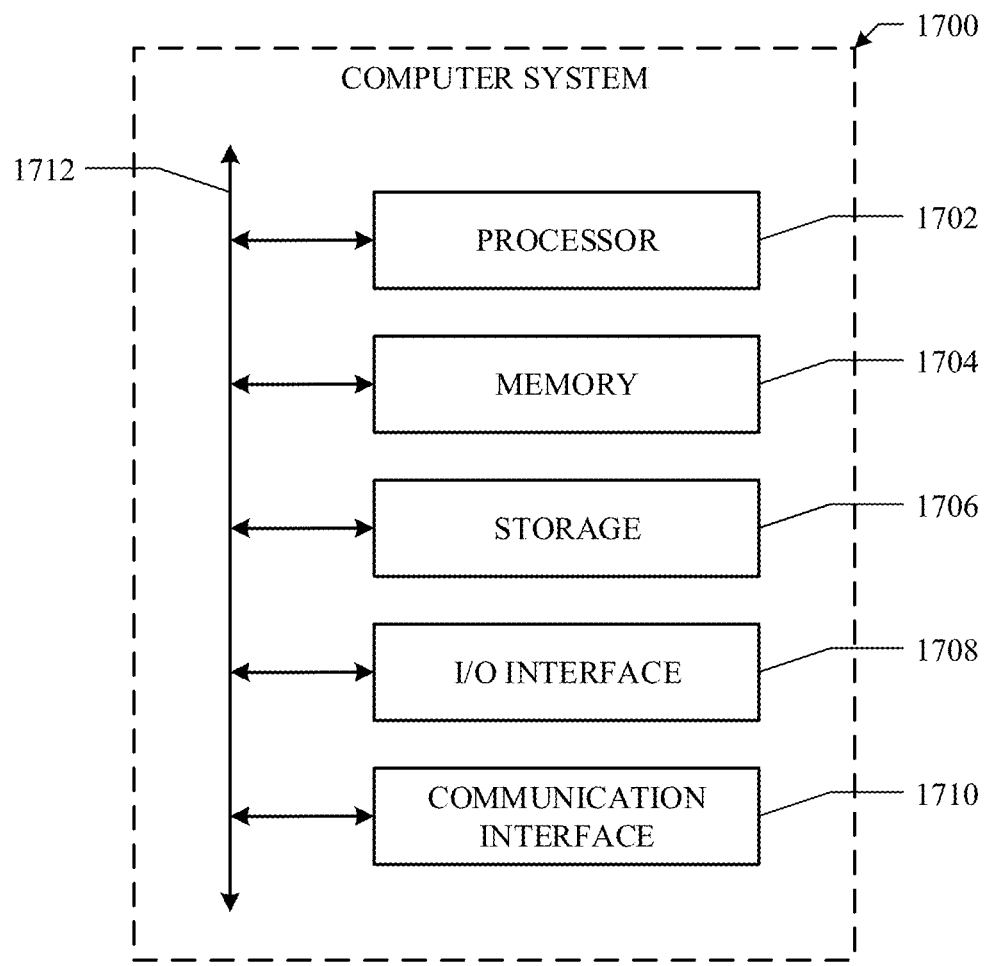
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that the tracking engine of the VIO-based tracking system may perform, at high frequency, localization and mapping for the device in the environment self-efficiently, and provide, at low frequency, descriptors and related features to the mapping unit to update or associate with the online map, in order to save power and cost. Particular embodiments of the present disclosure enable the tracking system to locate the device in environment precisely and self-efficiently by the current state information of the device (including a user's pose) determined by the processed images and pre-integrated motion data. Furthermore, by associating a map from the mapping engine with the observed information at the tracking engine discontinuously or on-demand, particular embodiments disclosed in the present disclosure may provide a light weight, power-efficient, continuously-tracking wearable device which comprises the tracking engine, and a local device which comprises the mapping engine.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
receiving, at an IMU integration unit, motion data captured by one or more motion sensors of a wearable device;
generating, at the IMU integration unit, a predicted pose of the wearable device based on the motion data of the wearable device;
receiving, at a tracking unit, a sequence of images of an environment captured by one or more cameras;
identifying, at the tracking unit, features in the sequence of images;
determining, at the tracking unit, correspondence data between the sequence of images based on the identified features in the sequence of images and the predicted pose received from the IMU integration unit;
determining, at a filter unit, current state information of the wearable device based on the correspondence data received from the tracking unit and the motion data received from the IMU integration unit, the current state information comprising at least a current pose of the wearable device relative to the environment captured by the one or more cameras;
retrieving, by a mapping unit of the computing system, regional map data from a remote map server using (1) the features identified by the tracking unit in the sequence of images of the environment and (2) the current state information of the wearable device determined at the filter unit, the regional map data being associated with a portion of a three-dimensional map hosted by the remote server;
receiving, at the tracking unit and from the mapping unit, map points and associated descriptors for the map points from the regional map data retrieved from the remote map server; and
identifying, at the tracking unit, one or more of the map points in the sequence of images based on one or more of the associated descriptors associated with the one or more of the received map points, wherein the determining of the current state information is further based on the identified one or more of the map points within the sequence of images;
wherein the mapping unit of the computing system performs the retrieval of the regional map data from the remote server at a second frequency that is relatively lower than a first frequency of the tracking unit at which the tracking unit identifies the features in the sequence of images of the environment and determines correspondences between the sequences of images based on the identified features.

2. The method of claim 1, wherein the determining of the correspondence data comprises:
identifying a first feature in a first image of the sequence of images; and
searching, in a second image of the sequence of images, for a second feature that corresponds to the first feature in the first image;
wherein the searching is performed along an epipolar line segment determined using the predicted pose.

3. The method of claim 1, wherein the current state information is determined based on an aggregation of the motion data.

4. The method of claim 1, wherein the current state information is determined using an optimization algorithm.

5. The method of claim 1, wherein the current state information is used to generate a next predicted pose of the wearable device.

6. The method of claim 1, wherein the IMU integration unit operates at a higher frequency than the tracking unit and the filter unit.

7. The method of claim 1, wherein the wearable device is an augmented-reality device, wherein the method further comprises:
rendering augmented-reality content based on the current pose.

8. The method of claim 1, wherein the current state information further comprises a current position of the wearable device relative to the three-dimensional map.

9. The method of claim 1,
wherein the mapping unit is configured to operate on demand or at a lower frequency than the IMU integration unit, the tracking unit, and the filter unit.

10. The method of claim 9,
wherein the IMU integration unit is located within a head-mounted device; and
wherein the tracking unit, the filter unit, and the mapping unit are implemented in a local computing device separated from the head-mounted device.

11. The method of claim 10, wherein the local computing device comprises one or more processors, wherein the one or more processors are configured to implement the tracking unit, the filter unit, and the mapping unit.

12. The method of claim 9,
wherein the IMU integration unit, the tracking unit, and the filter unit are located within a head-mounted device; and
wherein the mapping unit is implemented in a local computing device separated from the head-mounted device.

13. One or more computer-readable non-transitory storage media embodying software that is operable when executed to:
receive motion data captured by one or more motion sensors of a wearable device;
generate a predicted pose of the wearable device based on the motion data of the wearable device;
receive a sequence of images of an environment captured by one or more cameras;
identify features in the sequence of images;
determine correspondence data between the sequence of images based on the identified features in the sequence of images and the predicted pose;
determine current state information of the wearable device based on the correspondence data and the motion data, the current state information comprising at least a current pose of the wearable device relative to the environment captured by the one or more cameras;
retrieve regional map data from a remote map server using (1) the features identified by the tracking unit in the sequence of images of the environment and (2) the current state information of the wearable device, the regional map data being associated with a portion of a three-dimensional map hosted by the remote server;
receive map points and associated descriptors for the map points from the regional map data retrieved from the remote map server; and
identify one or more of the map points in the sequence of images based on one or more of the associated descriptors associated with the one or more of the received map points, wherein the determining of the current state information is further based on the identified one or more of the map points within the sequence of images;

wherein a mapping unit performs the retrieval of the regional map data from the remote server at a second frequency that is relatively lower than a first frequency of a tracking unit at which the tracking unit identifies the features in the sequence of images of the environment and determines correspondences between the sequences of images based on the identified features.

14. The media of claim 13, wherein to determine the correspondence data, the software is operable when executed to:

identify a first feature in a first image of the sequence of images; and search, in a second image of the sequence of images, for a second feature that corresponds to the first feature in the first image;

wherein the searching is performed along an epipolar line segment determined using the predicted pose.

15. The media of claim 13, wherein the current state information is determined based on an aggregation of the motion data.

16. The media of claim 13, wherein the current state information is determined using an optimization algorithm.

17. The media of claim 13, wherein the current state information is used to generate a next predicted pose of the wearable device.

18. A system comprising: one or more processors; and one or more computer-readable non-transitory storage media coupled to one or more of the processors and comprising instructions operable when executed by one or more of the processors to cause the system to:

receive motion data captured by one or more motion sensors of a wearable device;

generate a predicted pose of the wearable device based on the motion data of the wearable device;

receive a sequence of images of an environment captured by one or more cameras;

identify features in the sequence of images;

determine correspondence data between the sequence of images based on the identified features in the sequence of images and the predicted pose;

determine current state information of the wearable device based on the correspondence data and the motion data, the current state information comprising at least a current pose of the wearable device relative to the environment captured by the one or more cameras;

retrieve regional map data from a remote map server using (1) the features identified by the tracking unit in the sequence of images of the environment and (2) the current state information of the wearable device, the regional map data being associated with a portion of a three-dimensional map hosted by the remote server;

receive map points and associated descriptors for the map points from the regional map data retrieved from the remote map server; and identify one or more of the map points in the sequence of images based on one or more of the associated descriptors associated with the one or more of the received map points, wherein the determining of the current state information is further based on the identified one or more of the map points within the sequence of images;

wherein a mapping unit performs the retrieval of the regional map data from the remote server at a second frequency that is relatively lower than a first frequency of a tracking unit at which the tracking unit identifies the features in the sequence of images of the environment and determines correspondences between the sequences of images based on the identified features.

19. The system of claim 18, wherein to determine the correspondence data, the instructions are operable when executed by one or more of the processors to cause the system to:

identify a first feature in a first image of the sequence of images; and search, in a second image of the sequence of images, for a second feature that corresponds to the first feature in the first image;

wherein the searching is performed along an epipolar line segment determined using the predicted pose.

20. The system of claim 18, wherein the current state information is determined based on an aggregation of the motion data.

* * * * *